Feb. 22, 1938.                F. E. SCHWENTLER                 2,109,036
                           AUTOMATIC SLACK ADJUSTER
                           Filed Nov. 10, 1936            2 Sheets-Sheet 1
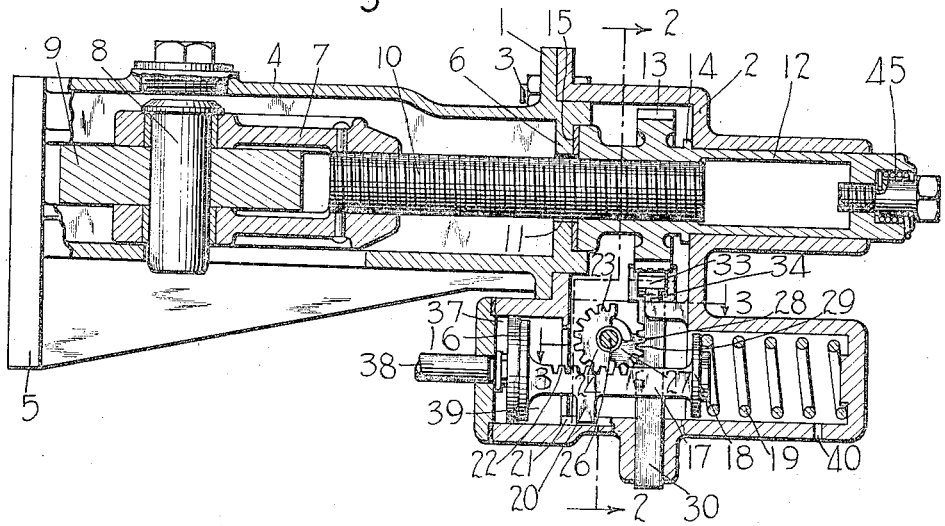
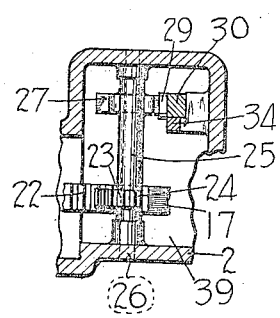
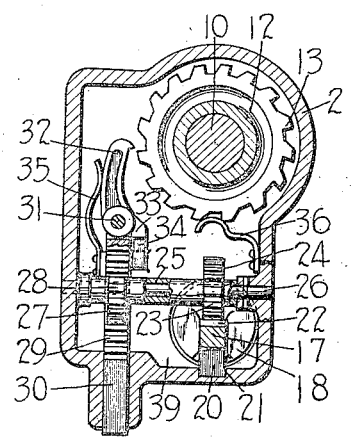
INVENTOR
FRANCIS E. SCHWENTLER.
BY
ATTORNEY Feb. 22, 1938.  F. E. SCHWENTLER  2,109,036
AUTOMATIC SLACK ADJUSTER
Filed Nov. 10, 1936   2 Sheets-Sheet 2
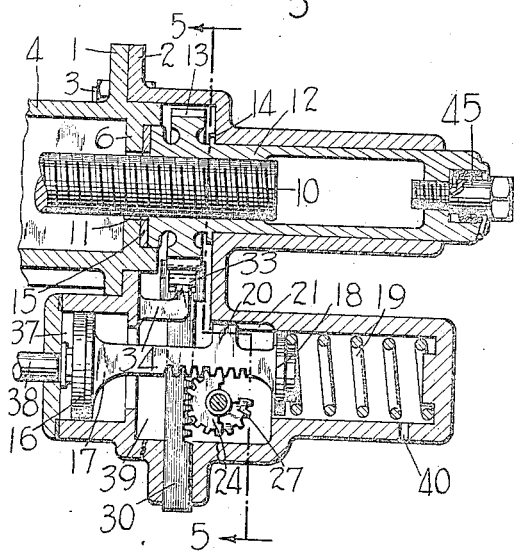
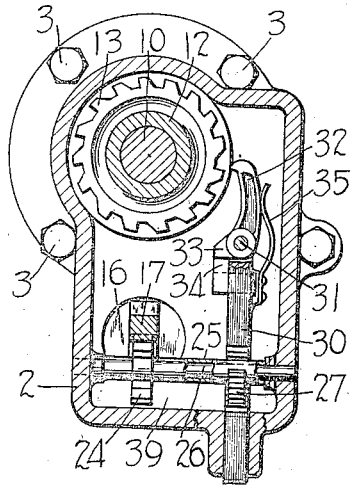
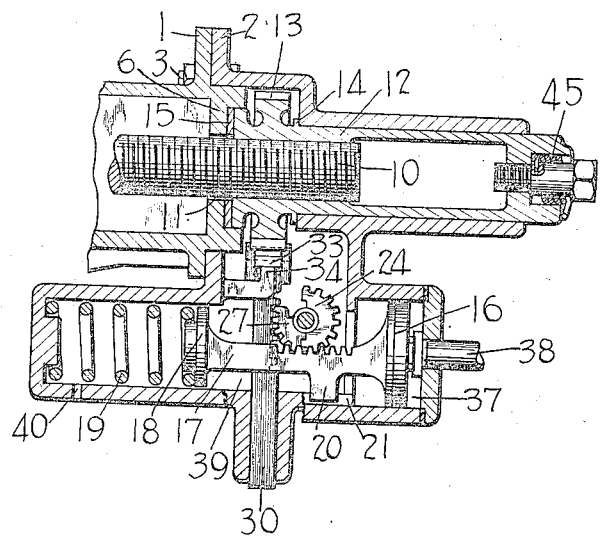
INVENTOR
FRANCIS E. SCHWENTLER
BY Wm. M. Cady
ATTORNEY Patented Feb. 22, 1938

2,109,036

UNITED STATES PATENT OFFICE 2,109,036

AUTOMATIC SLACK ADJUSTER

Francis E. Schwentler, St. Louis, Mo., assignor to The American Brake Company, Wilmerding, Pa., a corporation of Missouri Application November 10, 1936, Serial No. 110,110

9 Claims. (Cl. 188—203)

This invention relates to automatic slack adjusters for railway brakes and more particularly to that type of slack adjuster disclosed in my pending application, Serial No. 111,222 filed November 17, 1936, in which the longitudinal axes of the slack take-up mechanism and the motor for actuating the mechanism are spaced apart and extend parallel with each other.

The principal object of the present invention is to provide an automatic slack adjuster of the above mentioned type having a simplified driving means from the actuating motor to the slack take-up mechanism.

In the accompanying drawings, Fig. 1 is a vertical longitudinal sectional view of an automatic slack adjuster embodying the invention; Fig. 2 is a cross-sectional view of the same taken on the line 2—2 of Fig. 1, and Fig. 3 is a fragmentary sectional view taken on the line 3—3 of Fig. 1. Fig. 4 is a fragmentary vertical longitudinal sectional view of an automatic slack adjuster embodying a modification of the invention, and Fig. 5 is a cross-sectional view of the same taken on the line 5—5 of Fig. 4. Fig. 6 is a sectional view similar to Fig. 4 but illustrating another modification of the invention.

As shown in the drawings, the slack adjuster may comprise casing sections 1 and 2 which may be secured together by bolts 3 or the like.

The casing section 1 may comprise a horizontally disposed hollow portion 4 which, at one end, is provided with an integral laterally extending face plate 5 which is adapted to be secured to any suitable member of a car truck or body or to the usual brake cylinder (not shown) of a fluid pressure brake equipment, and at the other end is provided with a wall 6.

Slidably mounted in the portion 4 of the casing section 1 so as to be movable back and forth longitudinally thereof is a non-rotatable crosshead 7 which is operatively connected, by means of a pin 8, to a horizontally disposed laterally extending brake element 9 to be adjusted, which element may be the dead brake lever of a railway truck brake rigging.

Secured to the cross-head 7 is a non-rotatable slack take-up screw 10 which extends longitudinally of the hollow portion 4 of the casing section 1 and through an opening 11 in the end wall 6 of said casing section, and which at its outer end has screw-threaded connection with a rotatable adjusting nut 12 journalled in the casing section 2 and wall 6 in axial alignment with the screw.

The adjusting nut 12, adjacent its inner end, is provided with a ratchet wheel 13 and to the right of the ratchet wheel is provided with an annular collar 14 which is adapted to engage with the casing section 2 to prevent undue longitudinal movement of the nut in the direction toward the right hand, undue movement of the nut in the opposite direction being prevented by the engagement of the inner end of the nut with an annular thrust bearing plate 15 abutting the end wall 6 of the casing section 1.

The outer end of the adjusting nut 12 projects beyond that portion of the casing section 2 in which the nut is journalled so as to provide for the engagement of the nut by a wrench or other suitable tool when it is desired to reset the adjuster as is necessary when worn brake shoes are replaced by new ones.

Arranged below the take-up screw 10 and adjusting nut 12 and slidably mounted in the casing section 2 to move back and forth parallel to the longitudinal axis of the adjusting nut 12 is a piston 16 having a piston rod 17 having at its outer end a spring seat 18 which is operatively engaged by one end of an actuating spring 19, the opposite end of the spring being seated on the casing section 2.

The piston rod is provided with a lug 20 which is slidably guided in a groove 21 provided in the casing section 2, the engagement of the lug within the groove by the casing preventing rotation of the piston stem and thereby the piston relative to the casing. In each of the mechanisms illustrated in Figs. 1 and 6 the lug 20 projects downwardly from the under side of the piston rod and in the mechanism illustrated in Fig. 4 it projects upwardly from the upper side of the piston rod.

In the form of the invention shown in Figs. 1 to 3, the upper side of the piston rod 17 is provided with teeth 22 which mesh with the teeth 23 of a rockable pinion segment 24 preferably integrally connected to one end of a sleeve 25 rockably mounted on a pin 26 which extends at right angles to the piston rod and which is carried by the casing section 2. To the other end of the sleeve 25 there is integrally connected a pinion segment 27 having teeth 28 which mesh with teeth 29 provided on one side of a vertically movable rack 30 which is slidably guided at its lower end by the casing section 2. The rack 30 extends above the sleeve 25 and pivotally mounted on the upper end of the rack by means of a pin 31, is a pawl 32 which, as will hereinafter more fully appear, is adapted to be moved into and out of engagement with the teeth of the ratchet wheel 13.

The pawl 32 is provided with a laterally extending lug 33 which, when the rack 30 is in its lower or normal position as shown, is engaged by a stationary lug 34 carried by the casing section 2 and which by reason of such engagement is maintained out of engagement with the ratchet wheel against the action of a spring 35 which is carried by the rack 30 and which tends to urge the latch toward the ratchet wheel.

Unwanted rotation of the adjusting nut 12 is prevented by the action of a leaf spring 36 which is secured to the casing section 2 and which frictionally engages the teeth of the ratchet wheel 13.

At one side of the piston 16 there is a chamber 37 which is connected to a pipe 38 which leads to the brake cylinder of a fluid pressure brake equipment. While the brake cylinder is not shown it will be understood that the pipe 38 may be connected thereto in the usual well known manner, in which, with the brakes released, the pipe is open to the non-pressure side of the brake cylinder piston and consequently to the atmosphere, and in which, when effecting an application of the brakes, the piston travel is excessive, due to wear of brake shoes or connected brake elements, the pipe is connected to the pressure side of the brake cylinder piston. At the other side of the piston 16 there is a chamber 39 which is connected to the atmosphere through a passage 40 in the casing section 2 or any other suitable atmospheric communication.

The rack and pinion mechanism shown in Fig. 4 differs from that shown in Figs. 1 to 3 in that the pinions are arranged at the underside of the piston rod 17 and on the right hand side of the vertically movable rack 30 and in that the rack 30 is located at the right hand side of the longitudinal axis of the adjusting nut 12. The slack adjuster shown in Fig. 6 differs from that shown in Figs. 1 to 3 in that the actuating motor and rack and pinion mechanism are reversed end for end.

In operation, if in effecting an application of the brakes, the brake cylinder piston moves far enough to connect pipe 38 to the pressure side thereof, fluid under pressure will flow through pipe 38 to piston chamber 37 of the slack adjuster. Fluid under pressure thus admitted to chamber 37 causes the piston 16 and thereby the piston rod 17 to move inwardly compressing the spring 19. As the piston and piston rod thus move, the pinion segments are caused to operate to move the rack 30 upwardly. As the rack 30 is being moved upwardly the spring 35 acts to rock the pawl 32 into the path of travel of the teeth of the ratchet wheel 13, and as the movement of the rack continues, the pawl ratchets over the back of the first tooth beyond the end of the pawl and into operative engagement with said tooth when the piston and thereby the rack have reached the limit of their travel.

When in effecting the release of the brakes, the brake cylinder piston, in its movement to release position, again connects the pipe 38 to the non-pressure or atmospheric side of the piston, the pressure of fluid in the take-up piston chamber 37 is reduced to atmospheric pressure.

As the pressure of fluid in chamber 37 is thus being reduced, the spring 19, which has been previously compressed, acts to move the piston rod 17 and thereby the piston 16 outwardly to their normal position as shown in the drawings. As the piston rod thus moves the pinion segments 24 and 27 are caused to rotate and move the rack 30 and thereby the pawl 32 downwardly. The pawl 32 being in engagement with a tooth of the ratchet wheel 13 will, due to its downward movement, rotate the adjusting nut 12 relative to the adjusting screw 10, the nut causing the adjusting screw cross-head 7 and lever 9 to move toward the right to take-up slack. When the rack 30 nears its limit of travel, that is to say, when the piston 16 has nearly completed its outward stroke, the lug 33 of the pawl 32 is engaged by the stationary lug 34 on the casing section 2, so that as the movement of the rack 30 is continued, the pawl is caused to move out of engagement with the ratchet wheel 13, the actual separation of the pawl from the ratchet wheel occurring just shortly before the rack reaches its normal position in which it is shown in the drawings. The pawl 32 is now maintained in this position until such time as the piston 16 is again moved to effect the operation of the several parts of the adjuster to take-up slack.

With the pawl in its normal position as shown, the nut 12 may be rotated manually to reset the adjuster without opposition by the pawl.

In each of the forms of the invention shown the piston rod is so constructed that the pitch line of the teeth 22 at a point midway of the width of the faces of the teeth, is coincident with the longitudinal axis of the piston. This arrangement eliminates the tendency of the piston and piston rod to tilt as it is being moved by either fluid pressure or spring pressure and further contributes to a more compact mechanism.

As shown the outer end of the adjusting nut 12 in each form of the invention is provided with a stop mechanism 45 which is for the purpose of facilitating the resetting of the adjuster when the adjusting screw 10 engages the mechanism and stops the piston 16 before the piston has completed its adjusting stroke, but since this mechanism is substantially the same as that fully disclosed and broadly claimed in Patent No. 1,650,313 of Frederick G. Williamson, issued November 22, 1927, and since this mechanism is not claimed in the present application, further description thereof is deemed unnecessary.

While several illustrative embodiments of the invention have been described in detail, it is not my intention to limit its scope to these embodiments or otherwise than by the terms of the appended claims.

Having now described my invention, what I claim as new and desire to secure by Letters Patent, is:

1. In an automatic slack adjuster for brake rigging, in combination, a ratchet nut for taking up slack, a pawl operative to actuate said nut, a rack movable in the direction of its length for actuating said pawl, a pinion operative to actuate said rack, and means for actuating said pinion.

2. In an automatic slack adjuster for brake rigging, in combination, a ratchet nut for taking up slack, a pawl operative to actuate said nut, a rack movable at an angle to the axis of said nut for actuating said pawl, a pinion member operative to actuate said rack, a toothed member movable at an angle to the direction of movement of said rack for actuating said pinion member, and means for actuating said toothed member.

3. In an automatic slack adjuster for brake rigging, in combination, a ratchet nut for taking up slack, a pawl operative to actuate said nut, a rack movable at an angle to the axis of said nut for actuating said pawl, a pinion member operative to actuate said rack, a toothed member movable at an angle to the direction of movement of said rack for actuating said pinion member, and means for actuating said toothed member, the pitch line of the teeth of said toothed member being coincident with the longitudinal axis of said means.

4. In an automatic slack adjuster for brake rigging, in combination, a ratchet nut for taking up slack, a pawl operative to actuate said nut, a rack movable vertically for actuating said pawl, a pinion member operative to actuate said rack, a toothed member movable along a line parallel with the longitudinal axis of said nut and at right angles to the line of travel of said rack for actuating said pinion member, and means for actuating said toothed member.

5. In an automatic slack adjuster for brake rigging, in combination, a casing, a ratchet nut for taking up slack, a pawl operative to actuate said nut, a rack operatively connected to said pawl, a pinion member carried by said casing operative to move said rack to actuate said pawl, and means carried by said casing and movable at right angles to the longitudinal axis of said pinion member and to the line of travel of said rack for actuating said pinion member.

6. In an automatic slack adjuster for brake rigging, in combination, a casing, a ratchet nut for taking up slack, a rack slidably mounted in the casing for longitudinal movement, a pawl carried by said rack and operative thereby to actuate said nut, pinion means carried by said casing and operable to actuate said rack, a toothed member slidably mounted in the casing and operative to actuate said pinion means and means for actuating said toothed member.

7. In an automatic slack adjuster for brake rigging, in combination, a casing, a nut mounted in said casing operative to take-up slack, a rack slidably mounted in the casing for reciprocatory movement along a line at an angle to the axis of said nut, a pawl carried by said rack and operative thereby for actuating said nut, said pawl being adapted to operatively engage said nut without actuating it upon movement of the rack in one direction and being adapted to actuate the nut to take-up slack upon movement of the rack in the opposite direction, pinion means for moving said rack, and means for actuating said pinion means.

8. In an automatic slack adjuster for brake rigging, in combination, a casing, a nut mounted in said casing operative to take-up slack, a rack slidably mounted in the casing for reciprocatory movement along a line at an angle to the axis of said nut, a pawl carried by said rack and operative thereby for actuating said nut, said pawl being adapted to operatively engage said nut without actuating it upon movement of the rack in one direction and being adapted to actuate the nut to take-up slack upon movement of the rack in the opposite direction, means on said pawl adapted to cooperate with said casing for automatically moving the pawl out of operative engagement with said nut at substantially the same time as said rack completes its slack take-up stroke, a pinion for moving said rack and means for actuating said pinion.

9. In an automatic slack adjuster for brake rigging, in combination, a casing, a nut mounted in said casing operative to take-up slack, a rack slidably mounted in the casing for reciprocatory movement along a line at an angle to the axis of said nut, a pawl carried by said rack and operative thereby for actuating said nut, said pawl being adapted to operatively engage said nut without actuating it upon movement of the rack in one direction and being adapted to actuate the nut to take-up slack upon movement of the rack in the opposite direction, a pinion member operative to actuate said rack, and a motor operated rack for actuating said pinion member.

FRANCIS E. SCHWENTLER.